(12) United States Patent
Mabry

(10) Patent No.: US 11,771,117 B1
(45) Date of Patent: Oct. 3, 2023

(54) PORTABLE POPCORN MACHINE

(71) Applicant: Theresa Mabry, Emporia, VA (US)

(72) Inventor: Theresa Mabry, Emporia, VA (US)

( * ) Notice: Subject to any disclaimer, the term of this patent is extended or adjusted under 35 U.S.C. 154(b) by 422 days.

(21) Appl. No.: 17/204,760

(22) Filed: Mar. 17, 2021

(51) Int. Cl.
    *A23L 7/187* (2016.01)
    *A45F 3/14* (2006.01)
    *H05B 6/64* (2006.01)
    *A45F 3/00* (2006.01)

(52) U.S. Cl.
    CPC ............ *A23L 7/187* (2016.08); *A45F 3/14* (2013.01); *H05B 6/6426* (2013.01); *A23V 2002/00* (2013.01); *A45F 2003/003* (2013.01); *A45F 2003/142* (2013.01)

(58) Field of Classification Search
    CPC .............................. A23L 7/183; A23L 7/187
    See application file for complete search history.

(56) References Cited

U.S. PATENT DOCUMENTS

| | | | |
|---|---|---|---|
| 4,072,091 A | 2/1978 | Richardson | |
| 4,866,572 A * | 9/1989 | Blodgett ............... | A47J 47/14 62/331 |
| 5,369,255 A * | 11/1994 | Sherer .................. | A47J 47/14 219/739 |
| 8,464,634 B2 | 6/2013 | Cretors | |
| 2007/0278220 A1* | 12/2007 | Bostick ................ | H05B 6/666 219/730 |
| 2008/0217327 A1* | 9/2008 | Herrera ................ | H05B 6/6426 219/719 |
| 2009/0013988 A1* | 1/2009 | Kim ..................... | A47J 37/0623 219/400 |
| 2009/0114641 A1* | 5/2009 | Van Dyke ............ | H05B 6/6426 219/679 |
| 2009/0134155 A1* | 5/2009 | Kim ..................... | H05B 6/6402 219/757 |
| 2018/0168007 A1* | 6/2018 | Hall ..................... | H05B 6/6402 |

FOREIGN PATENT DOCUMENTS

| | | | |
|---|---|---|---|
| CN | 107668909 A | * | 2/2018 |
| CN | 107997347 A | * | 5/2018 |
| CN | 108464733 A | * | 8/2018 |
| CN | 112263077 A | * | 1/2021 |

* cited by examiner

*Primary Examiner* — John J Norton
(74) *Attorney, Agent, or Firm* — SANCHELIMA & ASSOCIATES, P.A.; Christian Sanchelima; Jesus Sanchelima

(57) ABSTRACT

A portable popcorn machine including a housing assembly, cooking assembly, electrical assembly, and popcorn assembly is disclosed. These assemblies in conjunction with one another provide a portable solution to cooking popcorn. Portable popcorn machine is a rectangular apparatus that includes an upper and lower portion. The upper portion includes a hinged door that gives a user access to the cooking cavity. Uncooked kernels are placed within this cavity and cooked via a heating system. The lower portion includes two vertically stacked drawers for the storage of uncooked kernels, popcorn serving bags, and condiments. Adjacent to the drawers in the lower portion, is a digital display for cooking time readout as well as a digital keypad for user cook time input. When the popcorn machine is ready to be moved the back panel of the machine includes two shoulder straps for easy carriage.

14 Claims, 4 Drawing Sheets

PORTABLE POPCORN MACHINE

BACKGROUND OF THE INVENTION

1. Field of the Invention

The present invention relates to portable popcorn machine and, more particularly, to a portable popcorn machine that is compact, lightweight, and easy to use.

2. Description of the Related Art

Several designs for a portable popcorn machine have been designed in the past. None of them, however, include a box shaped apparatus having an upper compartment with a hinged door that contains a heating system for cooking the popcorn.

Applicant believes that a related reference corresponds to U.S. Pat. No. 4,072,091 for a portable electric heating device for popping corn. Applicant believes another related reference corresponds to U.S. Pat. No. 8,464,634 for a machine for producing and dispensing popped popcorn. None of these references, however, teach of a portable popcorn machine comprising of a box shaped cooking compartment vertically stacked on multiple storage drawers.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a portable popcorn machine that includes a box shaped heating system with an upper cooking compartment and hinged door.

It is another object of this invention to provide a portable popcorn machine with a lower portion of the box shaped apparatus having multiple vertically stacked storage drawers to store uncooked popcorn and serving bags.

It is still another object of the present invention to provide a portable popcorn machine with a digital control pad positioned on the bottom front panel of the machine.

It is also another object of the present invention to provide a portable popcorn machine with a digital timer and clock display to be located above the digital control pad.

It is an additional object of the present invention to provide a portable popcorn machine with a rear panel that supports shoulder straps enabling the user to comfortably carry the machine.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
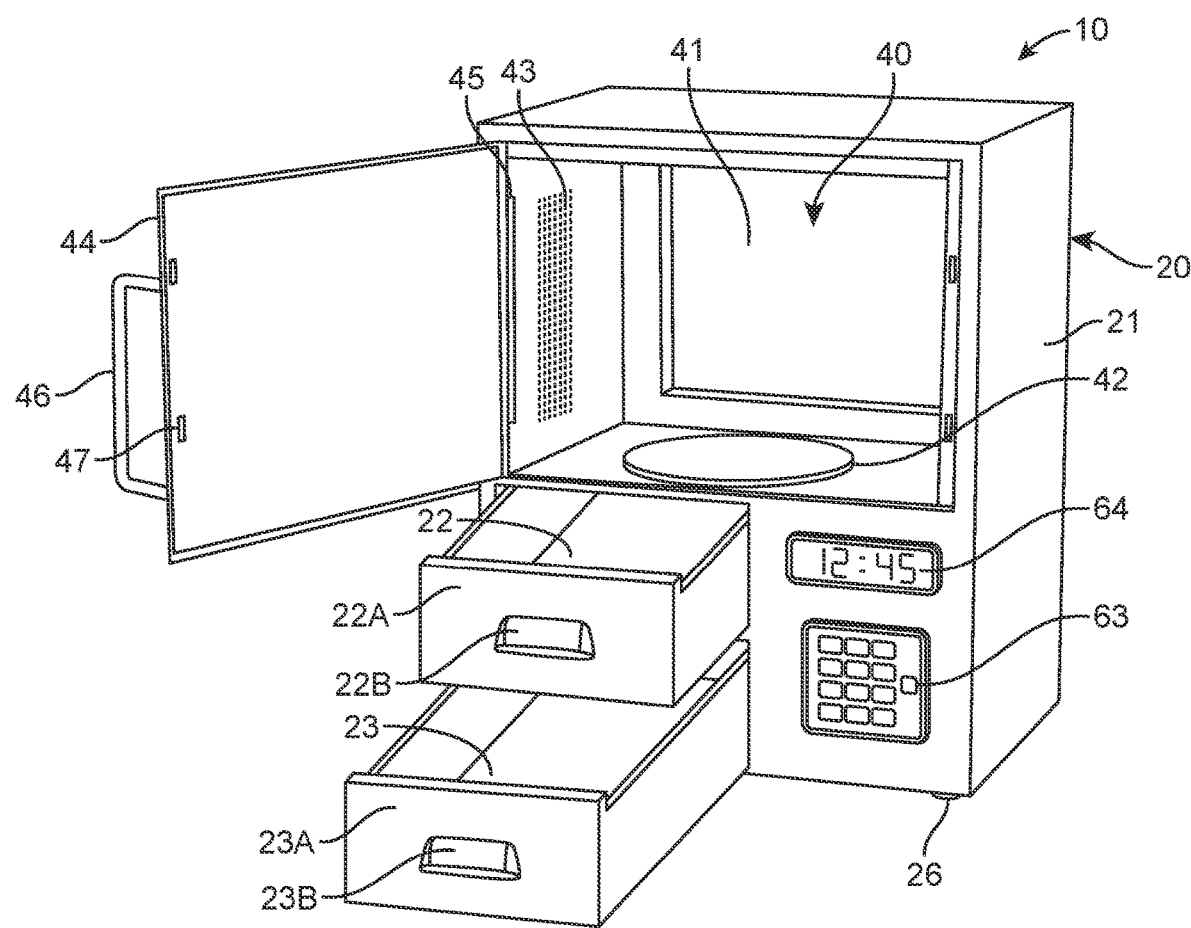
FIG. 1 represents an isometric view of portable popcorn machine 10 wherein door 44 first drawer 22A and second drawer 23A are shown ajar.

Referring now to the drawings, where the present invention is generally referred to with numeral 10, it can be observed that it basically includes a housing assembly 20, a cooking assembly 40, an electrical assembly 60, and a popcorn assembly 80.

Figure 2:
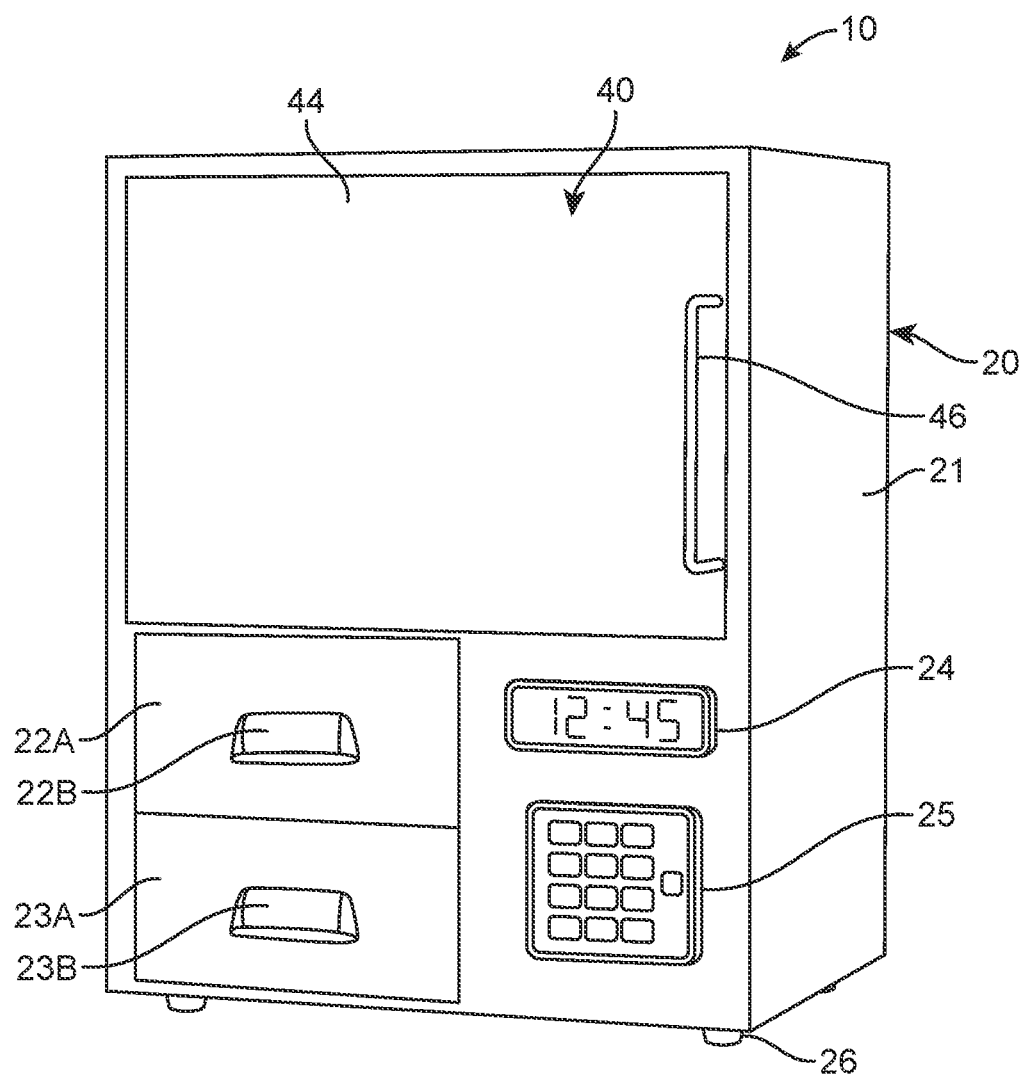
FIG. 2 shows a front view of portable popcorn machine 10 wherein door 44, first drawer 22A, and second drawer 23A are shown in a closed configuration.

As best illustrated in FIGS. 1-2, housing assembly 20 includes a housing 21. In one embodiment, the housing 21 may take the form of a rectangular prism and include an upper portion and a lower portion. The upper portion may be defined as the top portion of the housing 21 which includes a cooking cavity 41. The lower portion may be defined as portion below the floor of the cooking cavity 41. The lower portion may include a display window 24, a digital keypad window 25, a first drawer opening 22, and a second drawer opening 23. It may be preferable for the display window 24 and the digital keypad window 25, to be vertically stacked. A display window 24 and a digital keypad window 25 may also be adjacent to a first drawer opening 22 and a second drawer opening 23. The display window 24 may be located in the front lower portion of the housing 21. The display window 24 provides an opening wide enough by which the user can easily view information demonstrated by a digital display 64. The inner portion behind the display window 24 may provide a mounting point for the digital display 64. The digital keypad window 25 may be located in the front of the housing 21 under the display window 24. The inner portion behind the digital keypad window 25 may include a mounting point for a digital keypad 63. The digital keypad window 25 may provide an opening similar in shape to the digital keypad 63 for easy user input accessibility. It may be suitable for the housing 21 to also include feet 26. Shown best in FIG. 2, feet 26 may take the form of a rubber members located near the perimeter underneath housing 21. The feet 26 provides a method of elevating housing 21 off of any surface it is placed on.

Figure 3:
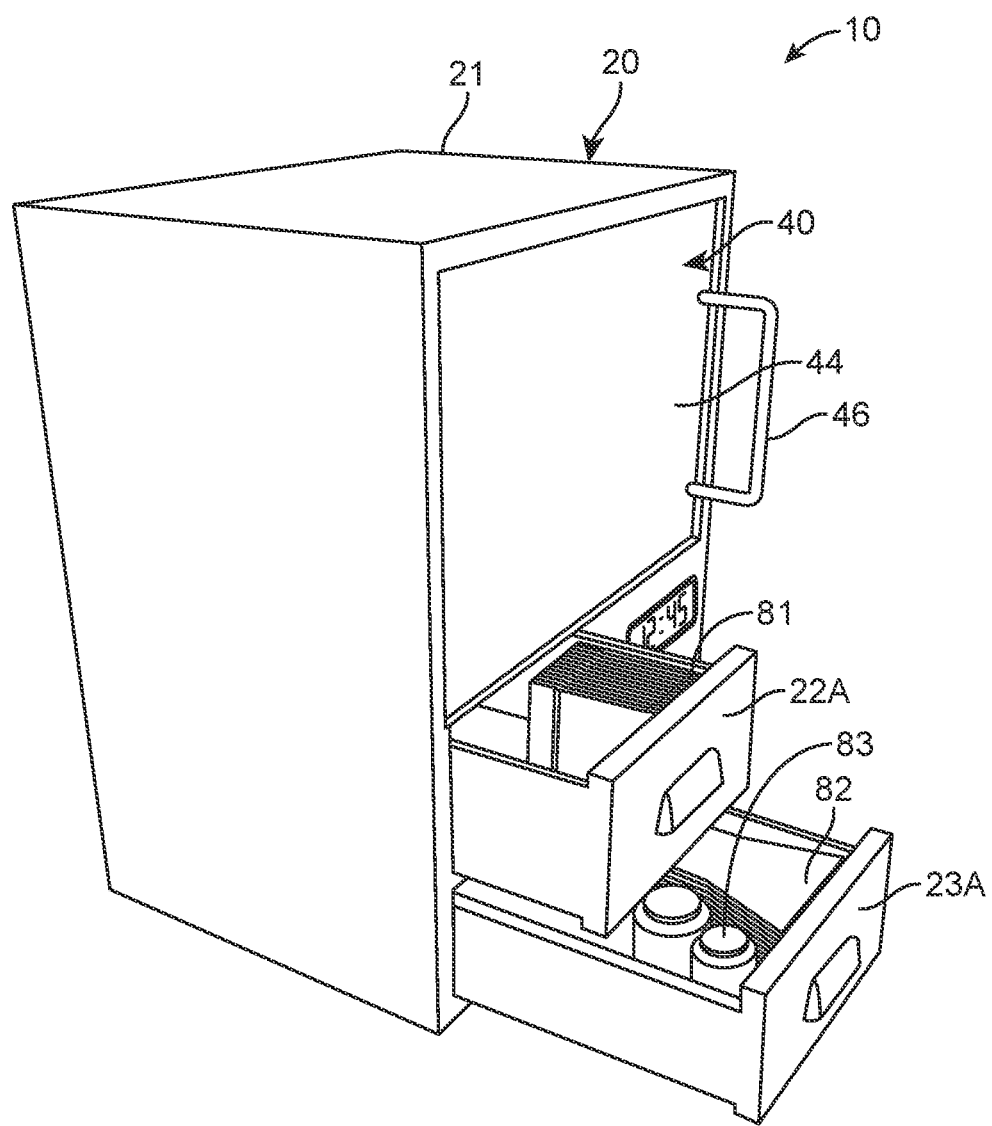
FIG. 3 illustrates popcorn assembly 80 distributed and stored within first drawer 22A and second drawer 23A.

As best depicted in FIG. 1, the front of the housing 21 may include a first drawer opening 22 and a second drawer opening 23. The first drawer opening 22 and the second drawer opening 23 may provide a cavity for drawers to fit fully therein. As shown in FIG. 2, the drawers may be defined as the first drawer 22A and the second drawer 23A. When closed, the front face of drawers may be flush to outer perimeter of the housing 21 within their respective openings as illustrated in FIG. 2. It may be preferable for the first drawer opening 22 and the second drawer opening 23 to provide a floor for drawers. The floor may allow the drawers to slide perpendicularly in and out of the first drawer opening 22 and the second drawer opening 23 with respect to the front of housing 21. This allows for a sturdy resting place for drawers to stay in a user's desired closed or open position. The first drawer 22A may be located just below cooking cavity 41. First drawer 22A may also be located to the left front of housing 21 vertically stacked on top of second drawer opening 23. Second drawer opening 23 may be located near the front bottom left perimeter corner of housing 21. It may be preferable for first drawer 22A and second drawer 23 to maintain significantly similar structures. The drawers may be made of a rigid material. The drawers may be rectangular and have an open top. As shown in FIG. 2, it may be preferable for first drawer 22A and second drawer 23 to have a first drawer handle 22B and a second drawer handle 23B respectively. First drawer handle 22B and a second drawer handle 23B may be located in the center front face of drawers. First drawer handle 22B and a second drawer handle 23B allow for the user to have a convenient grasping point for drawers. As depicted in FIG. 3, drawers may serve as a container for popcorn assembly 80. Popcorn assembly 80 includes uncooked kernels 81, a popcorn serving bag 82, and the condiments 83.

Best shown in FIG. 1, it may be suitable for the bottom of cooking assembly 40 to be located just above the drawers. Cooking assembly 40 may include cooking cavity 41, a cooking plate 41, a heat vent 43, a door 44, a hinge 45, a door handle 46, and a door latch magnet 47. Cooking cavity 41 may be a hollow rectangular prism with the front face open. The volume of cooking cavity 41 may be equal to a significant volume of the upper portion of housing 21. Cooking plate 41 may be a platform on which a user can place uncooked kernels 81 while the present invention is operational. Cooking plate 41 may be flat and circular with a raised ridge around its circumference. Cooking plate 41 may rest completely on the floor of cooking cavity 41. Cooking plate 41 may fit entirely within cooking cavity 41 without obstructing the closing of door 44. Cooking plate 41 may also be safe to heat and be made of glass or plastic. Cooking cavity 41 may have a recessed perimeter around its front open face. This recessed perimeter allows for door 44 to close flush to housing 21. Cooking cavity 41, in conjunction with a heating system 65, provide a location for the uncooked kernels 81 of popcorn assembly 80 to be cooked. Heat vent 43 may be located on the inner portion of one of the walls of cooking cavity 41. Heat vent 43 may take the form of a rectangular strip of small holes lining a predetermined area of an inner wall portion. Heat vent 43 may provide a pathway for heat and steam to be released out of cooking cavity 41. This will allow a user an unobstructed view within cooking cavity 41 via door 44. The door 44 may be hingedly attached close to the front left perimeter of housing 21 via hinge 45. The door 44 may be made of glass, plastic, or other transparent material. The door 44 may include door handle 46. The door handle 46 may be located near the outer perimeter of door 44. The door handle 46 may provide a member protruding outwardly with respecting to the face of housing 21. The door handle 46 allows the user to have a user grasping point for door 44 to be opened and closed easily. The door handle 46 may be mounted adhesively to door 44. Best illustrated in FIG. 2, door 44 may cover the front open face of cooking cavity 41 in its entirety while in a closed configuration. Referring back to FIG. 1, door 44 may be maintained in a closed configuration with the use of door latch magnet 47. In one embodiment, there may be a set of door latch magnet 47 placed near the perimeter of door 44 and within the recessed perimeter portion of the open face of cooking cavity 41. The set of door latch magnet 47 on door 44 and within the recessed perimeter portion of the open face of cooking cavity 41 may have opposing polarities to keep door 44 in a closed position when they are in close contact. The door latch magnet 47 may be secured in place adhesively.

Figure 4:
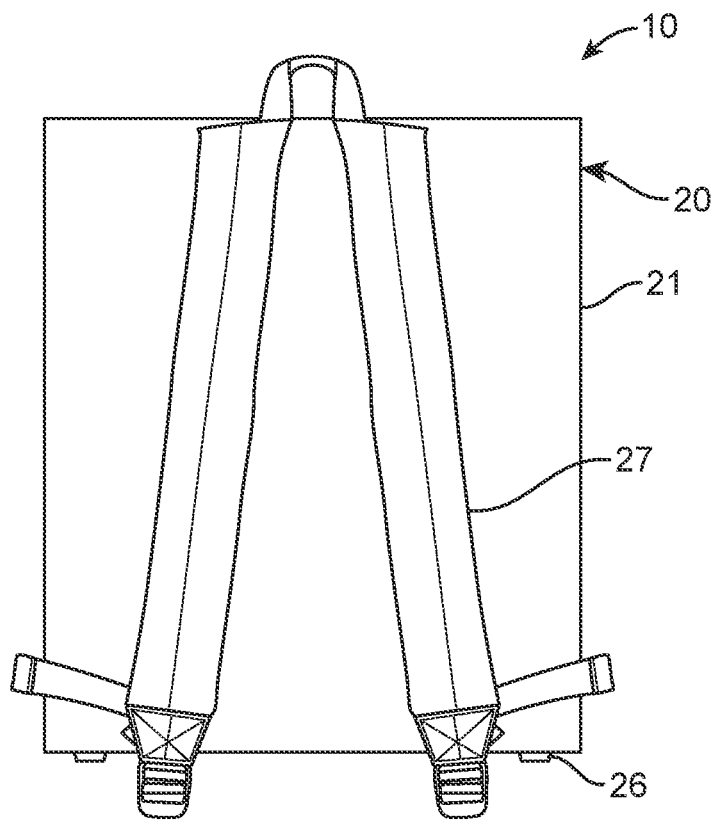
FIG. 4 is a representation of a back view of portable popcorn machine 10 having multiple shoulder strap 27 for a user's carrying convenience.

As best shown in FIG. 4, it may be preferable for the back face of housing 21 to include a shoulder strap 27. Shoulder strap 27 may have two mounting points. One mounting point may be located near the upper portion of housing 21. Another mounting point may be located near the lower portion of housing 21. It may be suitable for shoulder strap 27 to have an adjustable clasp so users of different proportions may be able to carry the present invention comfortably. In an alternate embodiment, the housing 21 may be fit in its entirety within the volume of a carrying case. It may be preferable for the carrying case to have shoulder strap 27.

Figure 5:
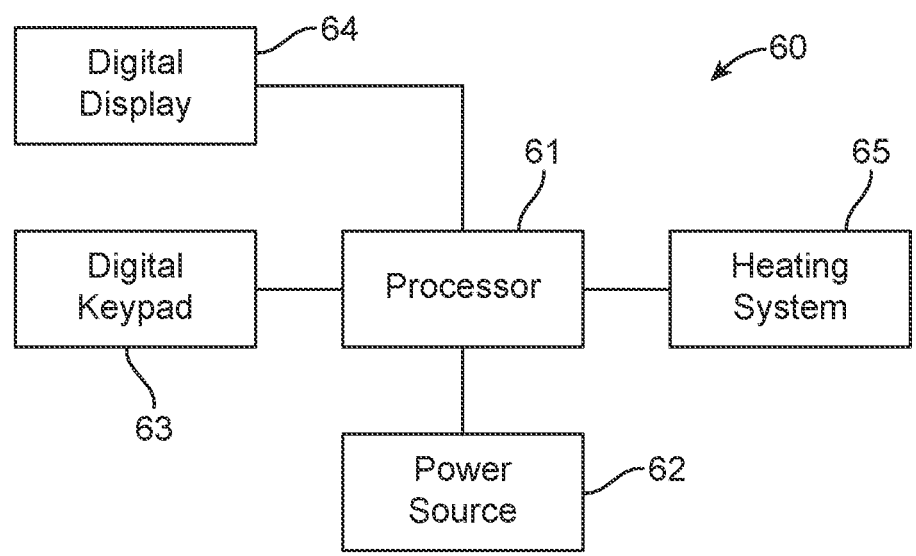
FIG. 5 is an overview of electrical assembly 60 which includes a processor 61, a power source 62, a digital keypad 63, a digital display 64, and a heating system 65.

Best demonstrated in FIG. 5, it may be preferable for the present invention to include electrical assembly 60. Electrical assembly 60 may include a processor 61, a power source 62, digital keypad 63, digital display 64, and heating system 65. In one embodiment of electrical assembly 60, power source 62 may be made as a rechargeable battery to be housed within housing 21. This would allow the user maximum portability when traveling with the present invention. It may also be suitable for power source 62 to be powered by an electrical outlet. In yet another embodiment power source 62 may be provided as a car USB charger. Once processor 61 receives power from power source 62 it may be preferable to allow the user control of electrical assembly 60 via digital keypad 63. Digital keypad 63 may be mounted just behind digital keypad window 25 near the lower right corner of housing 21. Digital keypad 63 may provide a user interface with numbered buttons 0-9 so they may input a desired cooking time. Once a cooking time is selected by a user, heating system 65 will begin to heat cooking cavity 41 as well as uncooked kernels 81 located therein. Heating system may be housed within housing 21 near the area surrounding cooking cavity 41. User input via digital keypad 63 may be displayed on digital display 64. Digital display 64 may be mounted just behind digital display window 24. Digital display 64 allows the user to read desired cooking time that was input as well as remaining cooking time.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a portable popcorn machine, comprising:
a) a housing assembly including a housing having a hollow interior, wherein the housing includes a front face and a rear face, said rear face of the housing including shoulder straps, wherein said shoulder straps are mounted near a top edge and a bottom edge of the rear face of said housing, said shoulder straps allowing for convenient portability of the housing, wherein said front face of the housing further includes at least one drawer; and
b) a cooking assembly including a cooking cavity within the hollow interior of said housing, said cooking cavity including a heat vent lining at least a portion of an interior wall of the cooking cavity, said housing including a door which provides access to the cooking cavity; and
c) an electrical assembly including a power source, said power source powering a processor, said processor receiving user input via a digital keypad, the electrical assembly also including a digital display wherein said digital display and the keypad are visibly mounted to said housing, the digital display showing information entered via the digital keypad, the information input via said digital keypad controlling timing of a microwave heating system, said microwave heating system heating the contents of said cooking cavity.

2. The system for a portable popcorn machine of claim 1, wherein said housing includes feet that elevate the base of the housing above a surface that the housing is placed upon.

3. The system for a portable popcorn machine of claim 1, wherein at least one drawer includes two drawers vertically stacked and housed within the lower left portion of the front face of said housing.

4. The system for a portable popcorn machine of claim 1, wherein said housing includes said digital keypad and said digital display mounted in a vertically stacked configuration to the front face of the housing.

5. The system for a portable popcorn machine of claim 1, wherein said power source is a car adapter.

6. The system for a portable popcorn machine of claim 1, wherein said power source is a battery.

7. The system for a portable popcorn machine of claim 1, wherein a door latch magnet interacts with a door magnet to maintain the door in a closed configuration.

8. The system for a portable popcorn machine of claim 1, wherein said door includes a door handle mounted to the door.

9. The system for a portable popcorn machine of claim 1, wherein said cooking cavity includes a cooking plate.

10. The system for a portable popcorn machine of claim 1, wherein the shoulder straps are mounted opposite to the front face of said housing.

11. The system for a portable popcorn machine of claim 1, wherein a carrying case receives said housing in its entirety.

12. The system for a portable popcorn machine of claim 1, wherein each of said at least one drawer includes a drawer handle.

13. A system for a portable popcorn machine, comprising:
   a) a housing assembly including a housing, said housing being a rectangular prism, said rectangular prism having a top and a base, wherein the housing includes a front face and a rear face, said rear face of the housing including shoulder straps, wherein said shoulder straps are mounted near a top edge and a bottom edge of the rear face of the housing, said housing further including drawers mounted in a bottom half portion of the front face, wherein said drawers slide perpendicularly with respect to the front face, said drawers having a closed configuration and an open configuration, said closed configuration allowing for the volume of said drawers to be received fully into said housing and close flush with the front face of the housing, said housing including a digital keypad and a digital display mounted in a vertically stacked configuration to a lower right quadrant of the front face, the drawers are adapted to house uncooked kernels, popcorn serving bags, and condiments therein;
   b) a cooking assembly including a cooking cavity in the form of a hollow rectangular prism, said cooking cavity located above said drawers and housed within the volume of a top half portion of said housing, wherein a lateral side wall located within the cooking cavity of the housing includes a heat vent, said front face of the housing including a door which provides access to the cooking cavity, said door being made of a transparent material, said door having a closed configuration and an open configuration, said door encompassing an entire front face of the cooking cavity while in a closed configuration; and
   c) an electrical assembly including a power source, said power source powering a processor, said processor receiving user input via said digital keypad, said digital keypad displaying information entered via said digital display, said digital keypad controlling timing of a heating system.

14. A system for a portable popcorn machine, consisting of:
   a) a housing assembly including a housing, said housing being a rectangular prism, said rectangular prism having a top and a base, wherein the housing includes a front face and a rear face, said rear face of the housing including shoulder straps, wherein said shoulder straps are mounted near a top edge and a bottom edge of the rear face of the housing, said housing including drawers mounted in a lower left quadrant of the front face, wherein said drawers slide perpendicularly from the front face, the drawers being suited for uncooked kernels, popcorn serving bags, and condiments to be housed therein, the drawers having a closed configuration allowing for the volume of said drawers to be received fully into said housing and close flush with the front face of the housing, said housing including a digital keypad and a digital display mounted in a vertically stacked configuration to the lower right quadrant of the front face, wherein the digital display is positioned above the digital keypad, said housing assembly including feet mounted to the four corners of the base of said housing;
   b) a cooking assembly including a cooking cavity in the form of a hollow rectangular prism, said cooking cavity located above said drawers and housed within the volume of a top half portion of said housing, wherein a lateral side wall located within the cooking cavity of the housing includes a heat vent, said heat vent taking the form of a rectangular strip of small holes lining a predetermined area, said cooking cavity including a circular cooking plate, said front face of the housing including a door which provides access to the cooking cavity, said door encompassing an entire front face of cooking cavity while in a closed configuration; and
   c) an electrical assembly including a power source, said power source powering a processor, said processor receiving user input via said digital keypad, said digital keypad displaying information entered via said digital display, said digital keypad controlling timing of a heating system.

* * * * *